United States Patent [19]

Rupp

[11] Patent Number: 4,465,102

[45] Date of Patent: Aug. 14, 1984

[54] CHECK VALVE

[75] Inventor: Warren E. Rupp, Mansfield, Ohio

[73] Assignee: The Warren Rupp Company, Mansfield, Ohio

[21] Appl. No.: 378,920

[22] Filed: May 17, 1982

[51] Int. Cl.$^3$ .............................................. F16K 15/14
[52] U.S. Cl. ................................. 137/849; 137/512.4; 137/847
[58] Field of Search ............ 137/849, 846, 847, 512.2, 137/513, 512.4

[56] References Cited

U.S. PATENT DOCUMENTS

| | | | |
|---|---|---|---|
| 2,524,764 | 10/1950 | Burke | 137/512.4 |
| 2,572,308 | 10/1951 | Brown | 137/846 |
| 2,670,757 | 3/1954 | Delany | 137/849 |
| 3,079,940 | 3/1963 | Keefe | 137/847 |
| 3,148,696 | 9/1964 | Hoke | 137/847 |
| 3,895,646 | 7/1975 | Howat | 137/849 |
| 3,896,849 | 7/1975 | Ervin et al. | 137/847 |

Primary Examiner—Martin P. Schwadron
Assistant Examiner—Sheri Novack
Attorney, Agent, or Firm—Pearne, Gordon, Sessions, McCoy, Granger & Tilberry

[57] ABSTRACT

A check valve for controlling the flow of fluid through a pipe or other means defining a passageway. The valve comprises an elastomeric valve element that permits flow of fluid through the passageway in a downstream direction while preventing the flow of fluid in the upstream direction. The valve element has a base that is secured to the means defining the passageway, there being an opening in the base through which fluid can flow. Flow of fluid is controlled by vanes projecting downstream from the base, each vane being flexibly connected to the base and being movable about its line of connection with the base between an open position in which the vanes permit ready flow of fluid in a forward direction, and a closed position in which the vanes make sealing engagement with each other, thus preventing upstream flow of fluid. The vanes are shaped to resist external pressures and a separate rigid supporting member is employed that has a base that is secured, with the base of the valve element to the means defining the passageway. The rigid member has a sleeve that supports the vanes adjacent their zones of pivotal connection to the base of the element against external fluid pressure. The construction permits the vanes to move from closed to open positions whenever the pressure on the upstream side of the valve element exceeds the pressure downstream of the valve element and to close when the pressure downstream of the valve element exceeds the pressure upstream of the valve element, thereby preventing flow of fluid in the upstream direction.

16 Claims, 8 Drawing Figures

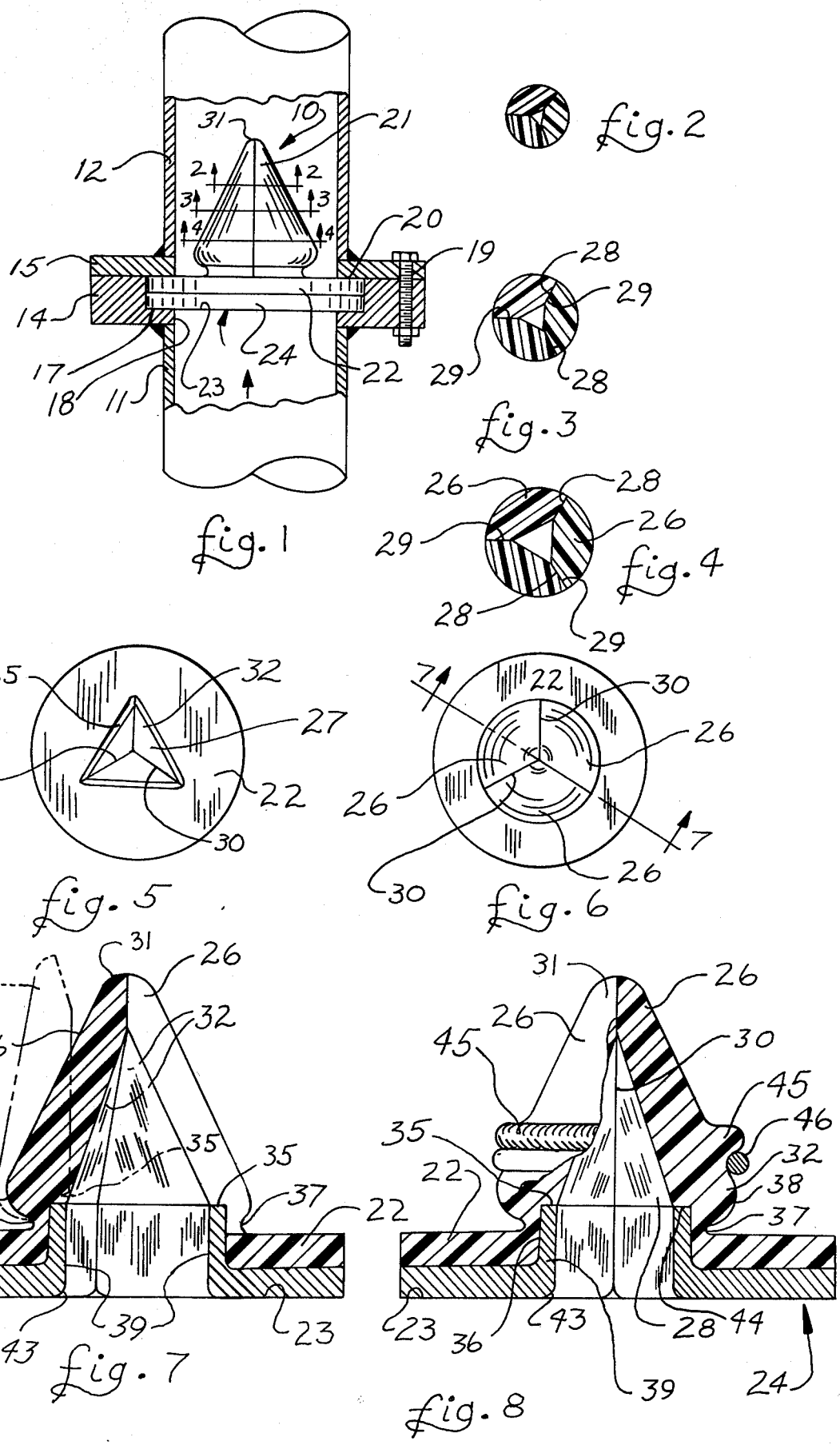

CHECK VALVE

BACKGROUND OF THE INVENTION

This invention relates to check valves of the type embodying flexible or displaceable vanes that are adapted to be moved away from the axis of the conduit or other passage with which they are intended to operate to permit substantially unimpeded flow of fluid through the conduit or other passage, hereinafter referred to as "passage," in one direction, referred to herein as the "forward direction," and to be moved toward the axis of the passage and into engagement with each other to prevent the flow of fluid in the passage in the opposite direction, referred to herein as the "reverse direction."

Valves of this general type are well known and have been extensively used for various purposes.

It has been proposed to construct such valves with vanes composed of rubber or other plastic or elastomeric material. Such valves are advantageous because they can be manufactured at reasonable cost and, when subjected to pressure in the reverse direction, are substantially free from leakage. However, usage of prior art valves of this general type has been severely restricted because the construction of the vanes is such that the valves are unable to withstand large back pressures without leakage or, if the vanes are made heavy enough to withstand such back pressures, then the forward pressure required to open the valves may become impermissibly large, with the result that the valves present substantial resistance to the flow of fluid through the conduit in the forward direction.

Prior art valves of the general type referred to are shown, for example, in the following U.S. patents:
U.S. Pat. No. 2,670,757—Mar. 2, 1954—Delany
U.S. Pat. No. 2,822,819—Feb. 11, 1958—Geeraert
U.S. Pat. No. 3,148,696—Sept. 15, 1964—Hoke
U.S. Pat. No. 3,174,434—Mar. 23, 1965—Schieve
U.S. Pat. No. 3,896,849—July 29, 1975—Ervin et al.
In service, valves of the type illustrated in these patents are subject to either or both of the disadvantages noted above.

SUMMARY OF THE INVENTION

An object of the invention is to provide an improved check valve that will substantially reduce or eliminate the problems noted above that are present in prior art check valves. More specifically, an object of the invention is to provide check valves of the type embodying elastomeric vanes that will have the ability to withstand large back pressures (pressures in the reverse direction) without leakage or damage to the valves while also offering low resistance to the flow of fluid in the forward direction. Other objects are the provision of such valves that can be manufactured and installed at reasonable cost, that will operate effectively for long periods of time, that will be substantially noiseless in operation, and that can be adapted to various uses and purposes.

Briefly, these and other objects of the invention are accomplished by the provision of a check valve embodying an elastomeric valve element having elastomeric vanes for controlling the flow of fluid through the valve, the valve also preferably comprising a substantially rigid supporting member which is adapted to support the elastomeric valve element. The supporting member has a base that is adapted to be secured in or to a fluid conduit such as a pipe or other element having a passage through which the flow of fluid is to be controlled, the base of the supporting member having an opening in communication with the said passage. The member supports the valve element which is composed of rubber, plastic, or other flexible elastomeric material. The valve element has an annular base portion that is adapted to be secured to the base portion of the supporting member and thus mounted in or on the conduit or other element with which the valve is associated. The base portion of the valve element, like the base of the supporting member, has an opening through which fluid may flow and movable closure elements or vanes projecting downstream from and toward the central axis of the base portion. The openings in the base portion of the valve element and the supporting member are preferably coaxial with the passage.

The vanes are adapted to be moved outwardly from the axis of the passage with which the valve is associated by the fluid pressure on the upstream side of the valve when that pressure exceeds the fluid pressure on the downstream side of the valve. The pressure differential results in the flow of fluid through the valve, the vanes being deflected outwardly from the axis of the valve to provide a substantially unobstructed passage for the flow of fluid through the valve in the forward direction. However, when the back pressure on the downstream side of the valve exceeds the forward pressure on the upstream side of the valve, the difference in these fluid pressures tends to create a reverse flow of fluid in the conduit, which results in movement of the vanes toward the axis of the valve where the edges of each vane make substantially leakproof contact with the edges of adjacent vanes, thus shutting off reverse flow of fluid through the conduit.

As noted above, valves of this general type are old. However, valves embodying the present invention are constructed with vanes that are designed not only to resist high back pressure but also to offer only small resistance to the forward flow of fluid through the valves. In the preferred form of the invention disclosed herein, a reinforcing or supporting member is utilized in conjunction with the flexible valve element and is arranged to support the element against forces directed radially inwardly against the element as well as forces directed axially from the downstream side of the valve. In addition, the contour of the vanes is such as to enable them to resist substantial back or reverse pressure while permitting them readily to be moved out of the way of fluid through the valve in the forward direction.

BRIEF DESCRIPTION OF THE DRAWINGS

FIG. 1 is a longitudinal section illustrating a preferred form of a valve made according to the present invention mounted in a passage comprising two aligned sections of a conduit, the valve being adapted to permit flow of fluid through the passage in one direction while preventing the flow of fluid in the opposite direction;

FIGS. 2, 3, and 4 are transverse sections through the valve of FIG. 1, taken along the lines 2—2, 3—3, and 4—4 of FIG. 1, respectively;

FIG. 5 is a transverse view illustrating the valve element as it appears when removed from the conduit, with the valve element in closed position, and looking at the valve element from the upstream side of the valve, i.e., looking in the direction of flow of fluid through the valve;

FIG. 6 is a similar view of the valve element removed from the conduit and looking in the direction opposite to the direction of flow of fluid through the valve;

FIG. 7 is a section taken along line 7—7 of FIG. 6, showing a flexible valve element assembled with its rigid supporting member, the assembly being removed from the conduit, one of the vanes of the element being shown in broken lines as being swung outwardly to the open position in which fluid can flow readily through the valve in the forward direction; and FIG. 8 is a side elevation, partially in section, illustrating a modified form of valve element.

DESCRIPTION OF A PREFERRED EMBODIMENT

Referring in detail to the drawings, in FIG. 1 a valve made according to a preferred embodiment of the invention is indicated in general at 10. The valve is shown as mounted in a passageway or conduit comprising an upstream section 11 and a downstream section 12 that are secured together by a flange 14 at the end of section 11 and a flange 15 at the end of section 12. The flanges may be welded to the conduit sections as indicated. The inside cylindrical surfaces 18 of the flanges preferably are equal in diameter to the inside diameters of the conduit sections 11 and 12. Flange 14 is thicker than flange 15 and has a recess 17 extending outwardly from the inner cylindrical surface 18 of the flange so that when the flange 15 is secured to the flange 14, as by bolts 19 distributed circumferentially near the periphery of the two flanges, an annular space 20 is left between the inner portions of the flanges 14 and 15, as shown.

A radially extending base flange 22 of a valve element, indicated in general at 21, and a radially extending flange 23 of a rigid supporting member, indicated in general at 24, project into the annular space 20 as shown, and are clamped therein between the flanges 14 and 15 of the conduit sections 11 and 12 by tightening the bolt and nut assemblies 19. In this manner, the valve element 21 is securely and accurately positioned within the passage or conduit made up of the sections 11 and 12.

Referring more particularly to FIGS. 1-6, the valve element 21 is designed to offer only slight resistance to the flow of fluid through the conduits 11 and 12 in the forward or upstream direction, from section 11 of the conduit to section 12 of the conduit, as indicated by the arrow in FIG. 1, while substantially preventing flow of fluid in the reverse or downstream direction, i.e., from section 12 of the conduit to section 11 of the conduit. This is accomplished by constructing the valve element 21 in the general form of a polyhedron made up of a plurality of vanes 26 secured to and projecting upstream from the base flange 22 of the valve element. In the example shown, the polyhedron comprises three identical vanes 26 projecting upstream from base 22 with each vane occupying one-third of the periphery of the triangular opening 27 through the base flange 22 of the valve element. The vanes are tapered in the upstream direction so that in the closed position the edges 28 and 29 of each vane are in sealing engagement, as indicated by lines 30, throughout their length with corresponding edges of adjacent vanes, and terminate at the apex 31 of the valve element 21. The drawing illustrates a valve having three vanes, but it is to be understood that for many purposes a greater number of vanes such as 4, 5, 6, or even more, vanes may be employed, depending upon the size of the passage and the service to which the valve is to be put. For most purposes, however, 3, 4, or 5 vanes are preferred.

In order to enable the vanes and the valve element to withstand substantial pressures in the reverse direction, the inner surfaces 32 of the vanes preferably are planar and the outer surfaces of the vanes are conical segments, so that when the vanes are urged together as shown in FIG. 1 under the influence of back pressure in the conduits, the external surface of the valve element is a right circular cone. The exterior of the valve element when the vanes are together is circular in cross section, as shown in FIGS. 2, 3, and 4, while the interior surface of the valve element is polygonal, the cross section of the interior being triangular in the illustrated embodiment, as shown in FIGS. 2, 3, and 4. With this arrangement, the flat, radially extending edge surfaces 28 and 29 of each vane are in contact with a similar edge surface of an adjacent vane. Thus, the vanes support each other against fluid pressure applied to the exterior of the vanes. Also, the vanes become progressively larger in cross-sectional area from the apex to the base of the cone formed by the several vanes when in closed position. The thickness, and thus the strength, of the vanes progressively increases from the apex toward the base of the valve element, enabling the valve element to withstand the force exerted on the exterior of the element. Although the total force exerted on the vanes by the back pressure of fluid in the conduit increases as the base flange 22 of the element is approached, because of the increased external area of the vanes, the strength of the vanes that is available to resist the back pressure also increases because of the increased cross-sectional area of the vanes, as well as the arched shape of the vanes.

It is to be noted that if the conical shape of the vanes and the valve element were carried through continuously from the apex 31 of the element to the base flange 22, then the vanes would strongly resist movement in directions away from the axis of the conduit and a substantial excess of forward pressure over the back pressure in the conduit downstream of the valve would be required to move the vanes outwardly to permit ready flow of fluid in the conduit in the forward direction indicated by the arrow in FIG. 1. In fact, it is probable that the pressure differential required would result in substantial resistance to the flow of fluid and substantial friction losses in the valve.

According to the present invention, this problem is eliminated by constructing the vanes as shown particularly in FIGS. 1 and 7, the thickness of each vane being reduced in the zone adjacent the connection of the vane to the base 22. The reduction in the thickness is accomplished in part by terminating the inner surface 32 of each vane remote from the apex of the vane in a shoulder 35 that extends outwardly towards the external surface of the vanes, the shoulders in the vanes being aligned so that they lie in a plane parallel to the base 22, as shown. In the direction away from the apex of the valve, the shoulders terminate in plane surfaces that define a polygonal opening 36, the polygonal cross-sectional shape extending through the base flange 22 of the valve element, as shown. The cross section of the opening in the portion thereof shown below the shoulder 35 in the drawing is enlarged as compared to the cross section of the opening immediately above the shoulder by an amount equal to the width of the shoulder. In the illustrated embodiment, the recess is triangular to correspond to the three vanes illustrated.

In order to further increase the flexibility of the zone of connection between the vanes and the base 22, the vanes are formed as shown in FIGS. 1, 7, and 8, each vane having an external groove 37 in the zone immediately adjacent the base flange 22 of the valve element. The bases of these grooves are straight lines and they lie parallel to the plane of the interior surface of the vane in which they are formed. As shown, the grooves 37 are slightly farther away from the apex 31 than the shoulder 35 and the exterior surfaces of the vanes are curved outwardly and upwardly, as shown at 38, to widen the outer portions of the grooves to permit the vanes to be moved outwardly away from the axis of the valve without interference between the exterior surfaces of the vanes and the adjacent surface of the base 22.

As shown, the provision of the shoulders 35 and grooves 37 provides each vane with a zone of decreased thickness and increased flexibility. The lines of separation of the vanes from one another extend to the plane of the downstream surface of the base 22 of the valve element. Thus, each vane is free to swing toward and away from the axis of the passage independently of the other vanes. The portions of the vanes of reduced thickness provided by the shoulder 35 and the groove 37 in each vane lie in straight lines so that the vanes may be deflected outwardly without requiring undue force and without subjecting the material of which the vanes are composed to undue stresses. The bending takes place about straight lines in the zone of reduced thickness in the region of connection of each vane to the base, the zones functioning in the manner of hinges.

While the reduction in the thickness of the vanes adjacent the base flange 22 improves the flexibility of the vanes, it also reduces the strength of the vanes and the valve element as against externally applied back fluid pressure. According to the present invention, the valve element is given ample strength, and the reduction in strength of the vanes to permit ready movement of the vanes between closed and opened positions of the valves is compensated for by the supporting member 24 which, as noted above, is clamped securely against the base 22 of the valve element, the radial flange 23 of the supporting member 24 reinforcing and supporting the base flange 22 of the valve element against fluid pressure exerted in an axial direction. The supporting member 24 may be composed of metal, a substantially rigid plastic, or other appropriate material.

In order to support the vanes against forces exerted upon them in an axial direction by the back pressure, and also to support the portions of the vanes of reduced thickness against fluid pressure exerted in radially inward directions, the supporting member 24 is provided with a hollow sleeve 39 that extends upstream within the flexible valve element. The sleeve 39 has an outer surface having a cross section corresponding to the interior of the opening 27 in the base flange 22 of the valve element. Preferably, the intersection between the interior of the sleeve 39 and the flange 23 of member 24 is rounded, as shown at 43, to minimize losses in the flow of fluids in this region. In the illustrated embodiment, the exterior surface of sleeve 39 is triangular and fits closely within the opening 27 in the lowermost portion of the valve element. The downstream end 44 of the sleeve lies in a plane transverse to the axis of the element and parallel to the base, and is positioned to engage and support the shoulders 35 formed in the vanes, the area of the end 44 being substantially equal to the combined area of the shoulders 35. The projecting sleeve thus supports the valve element against fluid pressure acting inwardly toward the axis of the valve, and also supports the vanes against forces acting axially parallel to the axis of the valve in the upstream direction. When the vanes are opened as shown in FIG. 7 with reference to vane 26b, to permit forward flow of fluid through the valve, they swing readily out of engagement with the end 44 of the sleeve 39, and when the back pressure increases, the vanes swing back into the position shown in FIGS. 1 and 8, where they are supported against axial forces by the end 44 of the sleeve.

By this arrangement, the annular groove formed in the valve element by the conjunction of the separate grooves in the vanes permits the vanes to move outwardly without requiring any excessive force, so that the valve does not impose undue back pressure or resistance to the flow of fluid through the conduit in the forward direction. At the same time, the projecting sleeve of the supporting member 24 supports the flexible element and the lower portions of the vanes against inwardly directed pressures exerted by the fluid in the downstream section 12 of the conduit, while the end 44 of the supporting sleeve 39 engages the shoulder 35 in each of the vanes and supports the vanes against the axial components of the fluid pressure forces exerted on the exterior of the vanes by the fluid within the downstream conduit section 12.

Thus, by this arrangement, check valves made according to the present invention not only open freely to permit movement of fluid through the valves in the forward direction but, by reason of the shape of the vanes and the construction and functioning of the supporting member, the valves have the ability to resist large back pressures without leakage and without substantial deformation or damage to the valves. As an example, valves embodying valve elements composed of a flexible rubber having a durometer hardness of 70 and adapted for use in a passage having an internal diameter of 1 inch have successfully withstood back pressures of 300 pounds per square inch without substantial leakage and without any evidence of damage to the valve elements.

FIG. 8 of the drawing illustrates a modified form of valve element and supporting member embodying the present invention. This form of the invention is adapted particularly for installations where closing of the valve may require more than the usual force because of the nature of the duty imposed upon the valve and the nature of the fluid that is controlled by the valve, and for situations which require prompt closing of the valve upon an increase in back pressure as compared to the forward pressure in the conduit controlled by the valve.

In FIG. 8, the same reference characters as used in FIG. 7 have been applied to corresponding parts. Essentially, the components of the valve shown in FIG. 8, including the element 21 and the supporting member 24, are substantially identical with corresponding elements of the previously described form of the invention. However, in this modification of the invention, each vane 26 of the flexible valve element 21 is provided with an integrally molded projection 45 that extends radially outwardly from the axis of the valve element and lies in a plane normal to the axis of the valve element so that the projections 45 in the assembled element define a complete circular bulge when the vanes 26 of the valve are in the closed position shown in FIG. 8.

In order to ensure that the valve will be closed promptly upon a reduction in back pressure in the valve to a value approaching or less than the forward pressure in the valve, a continuous elastic ring 46 is provided having a diameter such that it must be stretched in order to position it on the exterior of the valve element in a location upstream of the bulge or protuberance 45, as shown in FIG. 8. This elastic ring may be composed of rubber or other elastomer and rings of the type utilized as O-rings in hydraulic sealing devices are suitable. The rings may also consist in metallic garter springs. The rings must be stretched to place them over the protuberance 45 and into the position shown in FIG. 8, and they are dimensioned so that when in the position shown in FIG. 8, the ring constantly urges the vanes 26 of the valve element into engagement with each other in the closed condition as shown in FIG. 8. The contracting force of the rings is sufficient promptly to close the valve by moving the vanes into engagement with each other, as shown. The amount of force applied can be varied by varying the size and composition of the elastic ring, a greater force usually being desirable if the valve is employed for controlling the flow of a viscous fluid, or for other circumstances wherein a prompt and positive closing action of the valve is desired to minimize back flow while the valve is closing.

It is to be noted that, as shown, the protuberance 45 is preferably positioned at a point between the apex of the valve element and the base; and preferably at a level nearer the base and the groove 37 in the vanes about which the vanes pivot when they move between open and shut positions than to the apex. This is important because the outward movement of the vanes as the valve opens does not greatly increase the force that must be applied to the vanes by the fluid in order to hold the vanes in open position. The location of the protuberance and the size and composition of the elastic ring can be selected so that the resistance to opening offered by the vanes will not be increased unduly by the presence of the elastic ring 46 and yet the vanes will be moved promptly to a closed position whenever the back pressure in the passageway approaches or exceeds the forward pressure.

The valve elements can be constructed economically by molding them in one piece from a rubber or other elastomer of the desired composition and physical characteristics. After molding, the one-piece conical projection of the valve element having plane interior surfaces is completed by cutting the element along the lines 30 at the intersections of the plane inner surfaces 32 of the vanes, from the apex of the element to a point adjacent the intersection of the upstream portion of the groove 37 with the downstream surface of the base 22. Thus, the valve elements can be constructed economically and the installation of the valves in conjunction with a conduit or passage simply requires the provision of flanges, such as flanges 14 and 15, on the conduit sections or adjacent a passage, or some other conventional means for securing the base 22 of the valve element and the flange 23 of the supporting member 24 in leakproof relationship with each other and the structural elements defining the passage to be controlled by the valve.

Those skilled in the art will appreciate that various changes and modifications can be made in the invention without departing from the spirit and scope thereof. The essential characteristics of the invention are defined in the appended claims.

What is claimed is:

1. A check valve comprising:

a valve element composed of flexible material, and having
 a base portion adapted to be secured in a passageway, and defining an opening in communication with said passageway, and
 a plurality of vanes projecting from said base portion in a forward flow direction, each vane being hingedly attached to said base portion in a linear zone of reduced thickness relative to the adjacent portions of the vanes and being pivotable between an open position in which the vane extends substantially parallel to the direction of forward flow of fluid through said opening and a closed position wherein the edges of each vane maked sealing engagement with the edges of adjacent vanes, thereby substantially preventing flow of fluid through said opening in a reverse direction, whereby the vanes may move readily from open to closed position upon increase of back pressure in said passageway;
 each vane having a planar inner surface defining an apex at its forwardly extending end and each inner surface terminating at its end adjacent said base, in a shoulder extending outwardly from said inner surface, said shoulders lying in a common plane perpendicular to the axis of said element; and
 rigid means associated with said valve element and having a sleeve portion conforming to and engaging said opening through said base portion, the forwardly extending end of said sleeve portion engaging said shoulders for supporting said valve element against fluid pressures applied to the exterior of said valve element.

2. A check valve according to claim 1, wherein the inner surfaces of the vanes are substantially triangular in shape with the apexes of the triangles engaging each other when the vanes are in closed position, whereby in closed position the inner surfaces of the vanes define a pyramidal space having a base in the form of a polygon.

3. A check valve according to claim 1, wherein the valve element is formed integrally of flexible elastomeric material.

4. A check valve according to claim 1, wherein the outer surface of each vane is a segment of a cone and the outer surface of the element constitutes a right circular cone when the vanes are in engagement with each other in the closed position of the valve.

5. A check valve according to claim 4, wherein the external surface of each vane is provided with a protuberance extending outwardly from the outer surface of the vane, the protuberances lying generally in a plane that is normal to the axis of the valve element and is disposed between the apex of the element and the base thereof and nearer the base than the apex, and an elastic ring disposed on the exterior of the element between the protuberance and the base of the element, the diameter of the ring being such that the ring must be stretched to position it on the element between the protuberance and the base and such that when the ring is so positioned it exerts a force on the vanes tending to urge the vanes toward the axis of the element, whether the vanes are in open position or in closed position.

6. A check valve according to claim 5, wherein the ring is an O-ring composed of elastomeric material.

7. A check valve according to claim 5, wherein said elastic ring comprises a metallic garter spring.

8. A check valve according to claim 4, wherein the inner surfaces of the vanes are plane and in closed position define a pyramid whose axis extends at right angles to the base of the element.

9. A check valve according to claim 1, wherein the edges of each vane that make sealing engagement with the edges of adjacent vanes are plane.

10. A check valve according to claim 9, wherein said edges lie in planes extending radially outwardly from the axis of the valve element.

11. A check valve in accordance with claim 1, wherein said rigid means has a base portion engaging and supporting the base of said valve element, and means for clamping said base portion of said rigid means and the base of said valve element together in sealing engagement with the means defining said passageway.

12. A check valve according to claim 1, wherein the zone of connection between each vane and the base of the element is reduced in thickness adjacent the element by a groove formed in the exterior of the vane adjacent the element.

13. A check valve according to claim 12, wherein the shape of the groove is such as to permit the vane to be moved outwardly about its pivotal connection with the base without interference between the side of the groove and the base.

14. A check valve according to claim 1, wherein the valve element is an integrally molded member, the vanes being initially joined together along the lines of intersection of the internal surfaces of the vanes, being subsequently separated from each other along linear zones of intersection from the apex of the element to the base thereof, and extending substantially radially outwardly from the axis of the element.

15. A check valve according to claim 14, wherein the internal surfaces of the vanes in closed position define a pyramid whose axis extends at right angles to the base of the element.

16. A check valve comprising:
a unitary valve element composed of flexible elastomeric material, and having
a base portion adapted to be secured in a passageway, and defining an opening in communication with said passageway, and
a plurality of separate vanes projecting from said base portion in a forward flow direction, each vane being joined to said base portion in a linear zone defining a hinge axis and being pivotally movable about said hinge axis between an open position in which the vane extends substantially parallel to the direction of forward flow of fluid through said opening and a closed position wherein the edges of each vane make sealing engagement with the edges of adjacent vanes, the sealing edges of the vanes being planar, thereby substantially preventing flow of fluid through said opening in the reverse direction, the inner surfaces of the vanes being planar and substantially triangular in shape with the apexes of the triangles engaging each other at the apex of the valve element when the vanes are in closed position, whereby in closed position the inner surfaces of the vanes define a pyramidal space having a base in the form of a polygon having the same number of sides as there are vanes, the space tapering substantially to a point at the apex thereof, each of said triangular inner surfaces terminating at its base in a shoulder extending outwardly from said inner surface, said shoulders lying in a common plane perpendicular to the axis of said element, the outer surfaces of the vanes being segments of substantially concial shape that together substantially define a right circular cone projecting from the polygonal opening in the base and tapering to a circle of substantially smaller radius in the zone adjacent the apex of the cone when the vanes are in engagement with each other, and the zone of connection between each vane and the base of the element being reduced in thickness as compared to adjacent portions of the vanes, whereby flexible connections are provided between the vanes and the base of the element, whereby the vanes may be deflected readily between open and closed positions, whereby the valve does not offer substantial resistance to the flow of fluid through it in the downstream direction, and whereby the vanes may move readily from open to closed position upon increase of back pressure through the passageway to a value approaching the forward pressure of fluid in the passageway, and rigid means disposed within the passageway and having a sleeve portion engaging the opening through the base portion of said valve element, the downstream end of said sleeve portion engaging said shoulders for supporting said valve element against radially inwardly directed fluid pressures in the zone of attachment of said vanes to said base portion and against axial fluid pressures exerted on said vanes when they are in closed position, said rigid means having a base portion engaging and supporting the base of said valve element, and means for clamping said base portion of said rigid means and the base of said valve element together in sealing engagement with each other and with the means defining said passageway.

* * * * *